United States Patent [19]
Kijima et al.

[11] Patent Number: 5,094,985
[45] Date of Patent: Mar. 10, 1992

[54] SINTERED SILICON CARBIDE BODY WITH HIGH THERMAL CONDUCTIVITY AND PROCESS OF PRODUCING THE SAME

[75] Inventors: Kazunori Kijima, Kyoto; Eiki Arai, Narashino; Youichi Miyazawa, Narashino; Mikio Konishi, Narashino; Ken Kato, Funabashi, all of Japan

[73] Assignees: Kazunori Kijima Kyoto; Sumitomo Cement Co., Ltd., both of Tokyo, Japan

[21] Appl. No.: 432,210

[22] Filed: Nov. 6, 1989

[30] Foreign Application Priority Data

Jan. 30, 1989 [JP] Japan .................... 1-20571
Jan. 30, 1989 [JP] Japan .................... 1-20572

[51] Int. Cl.$^5$ .................................... C04B 35/56
[52] U.S. Cl. ............................. 501/88; 501/90
[58] Field of Search ......................... 501/88, 90

[56] References Cited

U.S. PATENT DOCUMENTS

| | | | |
|---|---|---|---|
| 4,133,689 | 1/1979 | Stroke | 501/88 |
| 4,295,890 | 10/1981 | Stroke | 501/91 |
| 4,370,421 | 1/1983 | Matsushita et al. | 501/90 |
| 4,495,122 | 1/1985 | Leimer et al. | 501/88 |
| 4,517,305 | 5/1985 | Suzuki et al. | 501/91 |
| 4,564,601 | 1/1986 | Kriegesmann et al. | 501/90 |
| 4,693,988 | 9/1987 | Boecker et al. | 501/90 |
| 4,762,810 | 8/1988 | Endo et al. | 501/90 |
| 4,847,060 | 7/1989 | Saiki et al. | 501/88 |

Primary Examiner—William R. Dixon, Jr.
Assistant Examiner—Sue Hollenbeck
Attorney, Agent, or Firm—Oblon, Spivak, McClelland, Maier & Neustadt

[57] ABSTRACT

Disclosed is a sintered silicon carbide body with a high thermal conductivity which has a thermal conductivity of not less than 150 W/m·K, which is produced by
(a) mixing
  (1) a first silicon carbide powder having a mean grain size of from 0.1 to 10 μm with
  (2) a second silicon carbide powder having a mean grain size of not greater than 0.1 μm prepared by
    (2-1) introducing a starting gas composed of a silane compound or silicon halide and a hydrocarbon into a plasma of a non-oxidative atmosphere, and
    (2-2) conducting gas phase reaction between the silane compound or silicon halide and the hydrocarbon while controlling the pressure of the reaction system within the range of from less than 1 atom to 0.1 torr, and
  (3) optionally, a carbon powder which is required for reducing oxides contained in both the first and second silicon carbide powders,
(b) optioanlly reducing the oxides with the carbon, and
(c) heating the resulting mixture for sintering. Also, processes of producing the same are disclosed.

22 Claims, 2 Drawing Sheets

SINTERED SILICON CARBIDE BODY WITH HIGH THERMAL CONDUCTIVITY AND PROCESS OF PRODUCING THE SAME

BACKGROUND OF THE INVENTION

The present invention relates to sintered bodies made of silicon carbide (hereafter, "sintered silicon carbide") which can be used suitably not only as various structural engineering materials, but also for those which require high thermal conductivity such as heat sink parts, heat exchange parts, and various molds or electrodes. The present invention also relates to a process of producing such sintered bodies.

Sintered silicon carbide bodies are chemically stable both at room temperature and at high temperatures and have excellent mechanical strength at high temperatures and therefore they are expected to be useful as a construction material for producing various parts such as those for gas turbines, engines, heat exchangers, nozzles of burners, etc. These sintered silicon carbide bodies are also considered to be promising as a material for precision mold members such as optical disc, aspherical lens and the like since they have good properties such as surface smoothness, high thermal conductivity, wear resistance, and the like. In addition, sintered bodies made of highly pure silicon carbide, which are excellent in thermal resistance and chemical resistance, have been increasingly used for the production of boats and processing tubes according to the recent trend in the semiconductor industry in which higher temperatures are used for heat treatment.

Since silicon carbide is a substance which is of highly covalent bonding in nature and thus difficult to sinter, it is necessary to add to silicon carbide powder one or more elements selected from boron, carbon, aluminum, beryllium or their compounds as a sintering aid in an amount of several percents by weight in order to densify it so as to have a high density. Therefore, the sintered silicon carbide bodies obtained generally have thermal conductivity which fluctuates greatly depending on the kind and amount of the sintering aid used. For example, sintered silicon carbide bodies which are obtained using convertional boron based sintering aid have a thermal conductivity on the order of from 80 to 150 W/m·K and those which are obtained using aluminum based sintering aid have a thermal conductivity of from 50 to 80 W/m·K. Both of them have no satisfactorily high thermal conductivity. This is believed to be ascribable to scattering of phonons, which are media of heat conduction, caused by increased density of impurities in the grains as the result of the formation of solid solution with silicon carbide of boron, aluminum or the like added as the sintering aid to the silicon carbide. On the other hand, when the amount of the sintering aid to be added decreases, the amount of elements introduced in the silicon carbide grains forming solid solution with silicon carbide surely decreases but phonons are scattered by pores generated due to decrease in the density of the sintered body, which raises problems that not only it is impossible to obtain high thermal conductivity but also characteristics inherent to silicon carbide are deteriorated.

Figure 1:
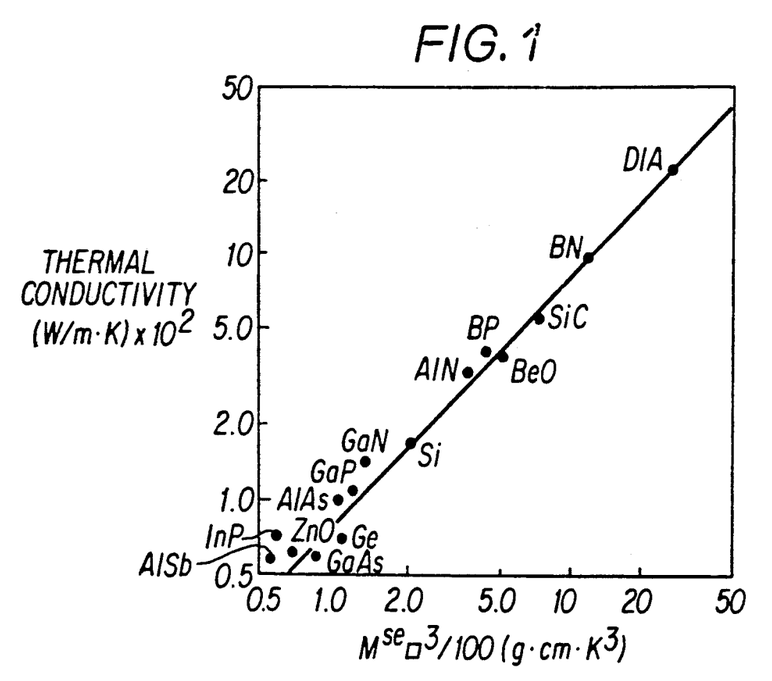
FIG. 1 is a graph representing the relationship between the theoretical thermal conductivity of a single crystal having an Admantine structure and its Leibfried-Schomann parameter, $M\delta\theta_D^3$ at a temperature of 300K, in connection with the sintered density of single crystal.

In other words, since the medium of heat conduction in ceramics is mainly phonon, which is a kind of the lattice oscillation of ions or atoms, and therefore those substances show high thermal conductivity in which the bond strength between the atoms is strong, the crystal structure is simple, the atomic weights of the ions or atoms constituting them are low and not so different from each other, and the lattice oscillation is highly symmetric. For example, FIG. 1 is a modification of the figure in the article by G. A. Slack, J. Phys. Chem. Solid. 1973, Vol. 34, pp 321-335 and represents the relationship between the theoretical thermal conductivity of a single crystal having an Admantine structure and its $M\delta\theta_D^3$ Leibfried-Schomann parameter, where M represents a mean molecular weight of unit lattice, $\delta$ represents the cube root of the volume occupied per atom in the unit lattice, and $\theta_D$ represents Debye temperature. From FIG. 1, it can be seen that silicon carbide is a substance which is essentially next to diamond and boron nitride in its high thermal conductivity. Actually, the thermal conductivity of α-type crystals of silicon carbide at room temperature is reported to be at most 460 W/m·K.

However, in the case of polycrystals, i.e., sintered bodies, the thermal conductivity is considerably low as stated above. Supposingly, this is because phonons which serve as a medium of heat conduction are scattered by various factors.

The factors could be grouped as follows.

(a) Impurities in the sintered bodies,
(b) Defects in the microstructure of the sintered bodies, and
(c) lattice defects In the case of (a), there may occur various phenomena such as formation of solid solution with the impurities in the crystal grains, sedimentation of secondary phase in the grains, and grain boundary segregation of impurities. In the case of (b), there may occur formation of cracks and pores, fluctuation of grain sizes and the like. In the case cf (c), there may be transition, lattice defects, distortion and the like in the crystal.

On the other hand, the process disclosed in Japanese Patent Application (Kokai) No. Sho 57-166368 uses beryllia as a sintering aid and contains reduced amounts of aluminum, boron and free carbon in the sintered body, thus achieving a high thermal conductivity as high as not less than 170 W/m·K. However, this sintered body is disadvantageous in that care must be taken for safety in the respective steps of manufacture since beryllia added as the sintering aid is a toxic substance. In addition, the conventional sintered body has a high electric insulation and therefore it is impossible to conduct electron discharge machining of it, with the result that shaping of the sintered body is achieved poorly. Therefore, application of the sintered body to the above-described various fields is difficult.

SUMMARY OF THE INVENTION

In view of the above-described state of the art, the present invention has been completed and has for its object to provide a sintered silicon carbide body with high thermal conductivity which has a thermal conductivity of not less than 150 W/m·K or not less than 180 W/m·K without deteriorating characteristics inherent thereto.

In order to attain the above-described object, intensive research has been made to obtain a high density sintered body without adding a sintering aid as means for removing the factors (a) and (b) as far as possible. As the result, it has now been found that a sintered silicon carbide body with a high thermal conductivity which has a thermal conductivity of not less than 150 W/m·K can be obtained without deteriorating various characteristics which silicon carbide has inherently such as high hardness, high corrosion resistance, high mechanical strength, excellent surface smoothness, and the like by mixing a first silicon carbide powder having a mean grain size of from 0.1 to 10 μm with a second silicon carbide powder having a mean grain size of not greater than 0.1 μm prepared by introducing a starting gas composed of a silane compound or silicon halide and a hydrocarbon into a plasma of a non-oxidative atmosphere, and conducting gas phase reaction while controlling the pressure of the reaction system within the range of from less than .1 atom to 0.1 torr, and then heating the resulting mixture for sintering.

It has also been found that a sintered silicon carbide body with a high thermal conductivity which has a thermal conductivity of not less than 180 W/m·K and which permits electron discharge machining can be obtained without deteriorating various characteristics which silicon carbide has inherently such as high hardness, high corrosion resistance, high mechanical strength, excellent surface smoothness, and the like by mixing a first silicon carbide powder having a mean grain size of from 0.1 to 10 μm with a second silicon carbide powder having a mean grain size of not greater than 0.1 μm prepared by introducing a starting gas composed of a silane compound or silicon halide and a hydrocarbon into a plasma of a non-oxidative atmosphere, and conducting gas phase reaction while controlling the pressure of the reaction system within the range of from less than 1 atom to 0.1 torr, and a carbon powder which is required for reducing oxides such as silicon dioxide contained in both the silicon carbide powders, and then heating the resulting mixture for sintering after reducing oxides in the initial stage of the sintering.

The present invention is based on the above-described discoveries.

DETAILED DESCRIPTION OF THE INVENTION

The process for sintering the sintered silicon carbide body of the present invention is explained in detail below.

Firstly, the first silicon carbide powder having a mean grain size of from 0.1 to 10 μm and the second silicon carbide powder having a mean grain size of not greater than 0.1 μm are provided. As for the first silicon carbide powder, there may be used those usually employed. For example, silicon carbide powders prepared by the following processes can be used.

(A) A process in which graphite and silicon are reacted at a temperature of not lower than 1,150° C.;

(B) A process in which graphite and silicon dioxide are reacted at a temperature of not lower than 1,475° C.; and (C) A process in which silica sand, coke, sawdust and salt are reacted in an electric oven at a temperature of from 2,200° to 2,500° C.

The crystal phase of the silicon carbide thus prepared may be of any type such as amorphous, α-type or β-type or mixture of these types. The mean grain size of the sintered silicon carbide body is in the range of from 0.1 to 10 μm, and preferably from 0.1 to 1 μm. This is because the surface stress is lower with larger mean grain size and driving force for sintering reduces to make it difficult to obtain high density sintered bodies.

As for the second silicon carbide powder, there can be used those prepared by plasma CVD methods, more particularly, those prepared by introducing a starting gas composed of a silane compound or a silicon halide and a hydrocarbon into a plasma of non-oxidative atmosphere and conducting gas phase reaction while controlling the pressure of the reaction system within the range of from lower than 1 atom to 0.1 torr. For example, when a starting gas composed of silicon tetrachloride and ethylene is introduced in argon plasma excited with high frequency wave to perform synthesis, ultrafine amorphous powder having a mean grain size on the order of from 0.01 to 0.03 μm and a small aspect ratio can be obtained. On the other hand, when similar synthesis procedures are repeated using a starting gas composed of monosilane and ethylene, β-type ultrafine powder having a mean grain size on the order of from 0.005 to 0.03 μm and a low aspect ratio can be obtained. Depending on the synthesis conditions, mixed phase powder composed of α-type and β-type can be obtained. The thus-prepared ultrafine powders are excellent in sinterability so that they can give rise to high density sintered bodies by simply mixing them with the first silicon carbide powder described above without adding sintering aids.

Next, the first and second silicon carbide powders are mixed with each other to form a mixture. Upon mixing, it is preferred to blend the second silicon carbide powder in an amount of from 0.5 to 50% by weight. This is because when the amount of the second silicon carbide powder is below 0.5% by weight, the effect of mixing the silicon carbide powder is insufficient, and on the other hand when it is above 50% by weight, the cost for the production increases since the second silicon carbide powder is prepared by costly CVD method, which increases price of the product, and the effect of increasing the sintered density nearly reaches a plateau. In order to obtain sintered bodies having a density as high as not less than 3,00 g/cm³, it is preferred to mix the ultrafine powder, i.e., the second silicon carbide powder in an amount of not less than 3% by weight.

Thereafter, the above-described mixture is heated for sintering to obtain a sintered silicon carbide body having a high thermal conductivity. The temperature for heating is preferably from 1,800° to 2,400° C. As for the sintering method, there can be used conventional sintering methods such as pressureless sintering, sintering under pressurized atmosphere, hot pressing, hot isostatic pressing (HIP) and the like. In order to obtain sintered silicon carbide bodies having higher density and thermal conductivity, it is preferred to use pressurized sintering methods such as hot pressing and the like. It is particularly preferred to conduct sintering in a sintering atmosphere of vacuum, inert gas or reducing gas.

The sintered silicon carbide bodies obtained according to the present invention has a uniform, fine structure of a grain size as small as from 2 to 3 μm and therefore they show excellent electron discharge machinability not attainable by the conventional methods. For example, upon wire-type electron discharge machining or ram-type electron discharge machining, the maximum surface roughness (Rmax) of the finished discharged surface is not higher than 1 μm, thus giving rise to a good finished surface. This enables free spherical finishing or three-dimensional finishing, with the result that it is possible to obtain sintered products having any desired complex shapes with high accuracy.

In addition, the sintered silicon carbide bodies of the present invention have corrosion resistance superior to the conventional ones and exhibit a three point flexural strength at room temperature of 65 kg/mm² and that at a high temperature (1,500° C.) of 80 kg/mm² and a Vickers hardness of not lower than 2,500. Therefore, the sintered silicon carbide bodies of the present invention fully satisfy various characteristics such as high hardness, high mechanical strength, high corrosion resistance, and excellent surface smoothness and the like so that they are promising in various fields of application.

Generally, silicon carbide grain tends to be oxidized on its surface to form oxides such as silicon dioxide and the like during its synthesis or storage and thus there arises problems that its sinterability is deteriorated and that its electric resistivity increases.

In order to attain the object of the present invention such as producing high density sintered bodies, it is effective to add carbon to the silicon carbide powder to reduce the oxides contained therein and conduct reduction treatment at an initial stage of the sintering step. For these reasons, carbon is added to the silicon carbide powder in a stoichiometric amount necessary for the reduction of the oxides contained the powder.

As for the carbon source, there may be used carbon black, colloidal carbon, and pyrolytic carbon derived from organic hydrocarbons with high residual carbon ratio. Examples of the organic hydrocarbons which can be used include phenol resins, polyphenylenes, furan resins, unsaturated polyesters, epoxy resins, furfural resins, amino resins, and the like. It is also possible to control the synthetic conditions of synthesis upon preparing the second silicon carbide powder by plasma CVD method so that the ultrafine powder (i.e., the second silicon carbide powder) can contain carbon. In this case, the carbon contained is present in the form of small grains which have a mean grain size of from 0.005 to 0.03 μm and are reactive. Therefore, addition of carbon to the ultrafine powder is particularly effective for obtaining effects of high sinterability, high electric conductivity, and the like. The crystal phase of carbon is in most cases amorphous but it can be crystalline depending on the conditions of synthesis.

Then, the mixture obtained by adding carbon to the silicon carbide powder is reduced. In the case of using silicon dioxide as the oxide, the reduction treatment is performed according to the following reactions (A) and (B).

$$SiO_2 + 2C \rightarrow Si + CO \qquad (A)$$

$$SiO_2 + C \rightarrow SiO + CO \qquad (B)$$

In order to accelerate the reactions, it is preferred to add carbon in an amount slightly higher than the stoichiometric amount. Also, it is preferred to perform the reactions at temperatures not higher than 1,800° C. since they must be performed at temperatures not exceeding the temperature at which sintering shrinkage of silicon carbide initiates. The atmosphere in which the reduction treatment is conducted is preferably in vacuum and the higher the degree of vacuum the greater effects can be obtained.

As the reactions (A) and (B) proceed, Si and SiO are formed. It is desirable to convert these compounds into SiC with free portion of the carbon added according to the reactions (C) and (D) described below since there is a possibility that Si and SiO cause the ultrafine silicon carbide (powder) (the second silicon carbide powder to grow extraordinarily although the compounds are effective in accelerating the sintering of silicon carbide in the initial stage of the sintering.

$$Si + C \rightarrow SiC \qquad (C)$$

$$SiO + 2C \rightarrow SiC + C \qquad (D)$$

Thereafter, the mixture after the reduction treatment is heated and sintered to obtain sintered silicon carbide bodies with a high thermal conductivity. The heating temperature is preferably from 1,800° to 2,400° C. As for the sintering method, there can be used conventional sintering methods such as pressureless sintering, sintering under pressurized atmosphere, hot pressing, hot isostatic pressing (HIP) and the like as stated before. In order to obtain sintered silicon carbide bodies having higher density and thermal conductivity, it is preferred to use pressurized sintering methods such as hot press and the like. It is particularly preferred to conduct sintering in a sintering atmosphere of vacuum, inert gas or reducing gas.

Figure 2:
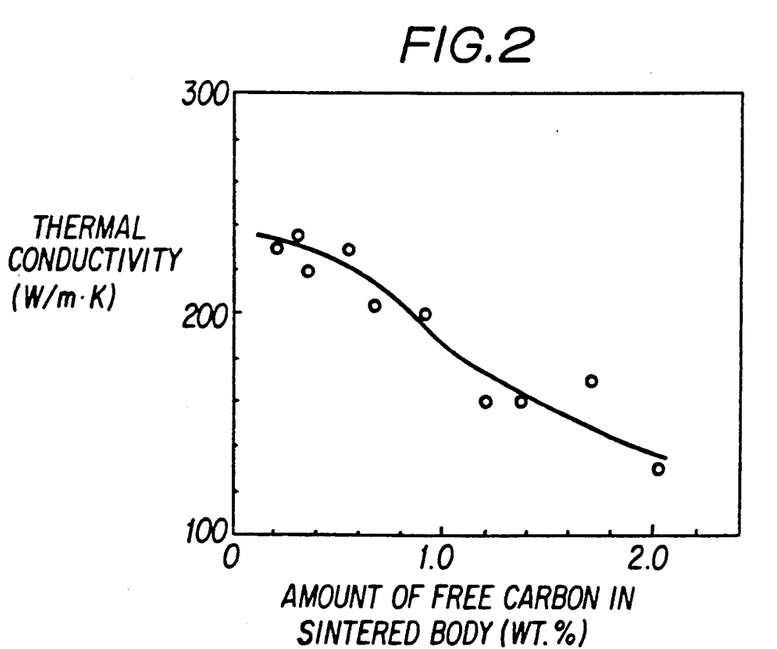
FIG. 2 is a graph representing the relationship between the amount of free carbon and thermal conductivity of the sintered silicon carbide body obtained by the process of the present invention.

Upon the addition of carbon, the characteristics of the sintered silicon carbide body is adversely affected when the amount of carbon to be added is so large that free portion is undesirably large. FIG. 2 is a graph representing the relationship between the amount of free carbon and thermal conductivity of the sintered silicon carbide body obtained by the process of the present invention. From FIG. 2, it can be seen that the thermal conductivity of the sintered body decreases according as the amount of free carbon contained therein increases, and that in order to render the thermal conductivity to a level of 180 W/m·K or more, it is desirable to decrease the amount of free carbon as low as 1% by weight or less.

Figure 3:
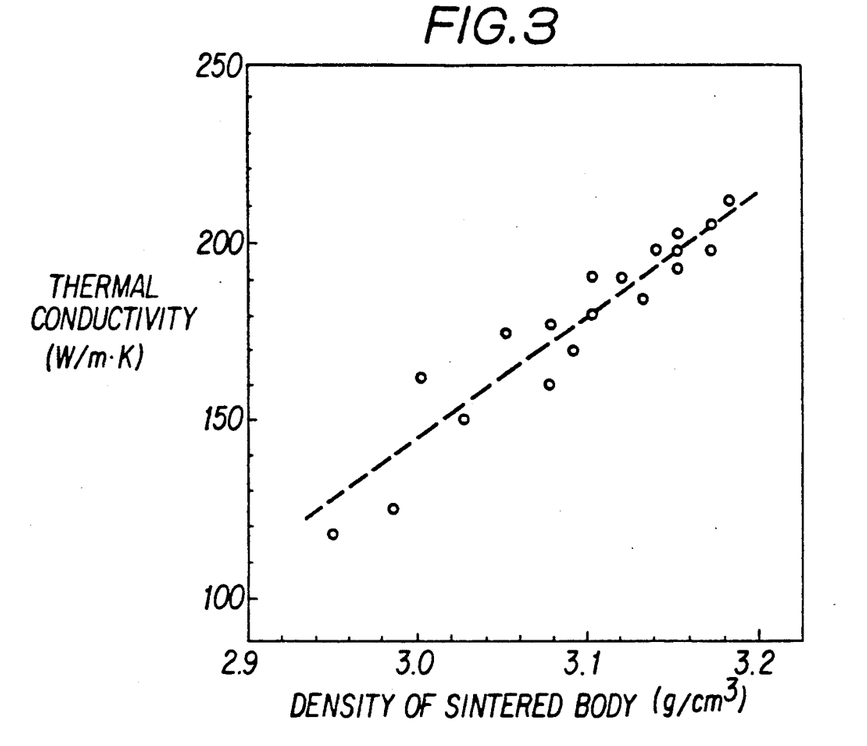
FIG. 3 is a graph representing the relationship between the sintered density and thermal conductivity of the sintered silicon carbide body obtained by the process according to one embodiment of the present invention.
Figure 4:
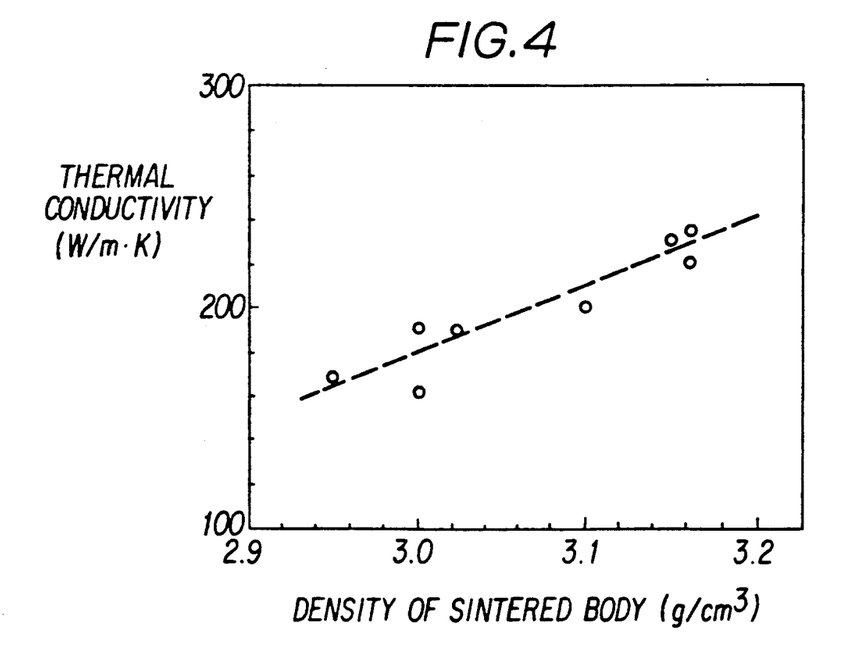
FIG. 4 is a graph representing the relationship between the sintered density and thermal conductivity of the sintered silicon carbide body obtained by the process according to another embodiment of the present invention in which carbon is added to reduce oxides contained in the silicon carbide powder.

The mechanism of high thermal conductivity of the sintered silicon carbide body of the present invention has not yet been clarified sufficiently. However, this is believed to be attained due to decrease in scattering of phonons because of use of no sintering aid, low content of impurities in the grain boundary and obtention of sintered silicon carbide body with high sintered density. FIG. 3 is a graph representing the relationship between the sintered density and thermal conductivity of the sintered silicon carbide body according to one embodiment of the present invention and shows that the higher the density of the sintered body, the higher the thermal conductivity. It can be seen from FIG. 3 that in order to obtain sintered bodies with a thermal conductivity of not lower than 150 W/m·K, it is preferred to increase the density of the sintered body to a level of not lower than 3.00 g/cm$^3$. The thermal conductivity of the sintered silicon carbide body is obtained by calculation from the thermal diffusivity and specific heat of samples measured by the conventional laser flush method and the density of samples measured separately.

The sintered silicon carbide bodies obtained according to this embodiment of the present invention has a uniform, fine structure of a grain size as small as from 2 to 3 μm and therefore they show excellent electron discharge machinability not attainable by the conventional methods. For example, upon wire-type electron discharge machining or ram-type electron discharge machining, the maximum surface roughness (Rmax) of the finished discharged surface is not higher than 1 μm,

EXAMPLE 1

To β-type silicon carbide powder having a mean grain size of 0.33 μm and a specific surface area of 12 m$^2$/g (the first silicon carbide powder) was added ultrafine amorphous silicon carbide powder having a mean grain size of 0.02 μm and a specific surface area of 150 m$^2$/g (the second silicon carbide powder) obtained by gas phase synthesis by means of plasma CVD method using as the starting material a mixture of silicon tetrachloride and ethylene, in an amount of from 1 to 10% by weight, and the mixture was dispersed in methanol and mixed for 12 hours using a ball mill.

Then, the resulting mixture was formed to obtain compacts into a disc of 40 mm in diameter using conventional monoaxial press and the molded compacts were heated to a temperature of 1,400° C. in vacuum using a hot press apparatus, followed by sintering in an argon atmosphere under a pressure of 400 kg/cm$^2$ at a sintering temperature of 2,150° C. for 45 minutes.

The sintered silicon carbide bodies thus obtained were examined for their sintered density, three point flexural strength at room temperature and thermal conductivity. The results obtained are shown in Table 1.

TABLE 1

| E/C | Run No. | Crystal Phase of First Silicon Carbide Powder | | Crystal Phase of Second Silicon Carbide Powder | | Amount of Free Carbon Wt. % | Amount of Boron Wt. % | Amount of Alumina Wt. % | Density of Sintered Body g/cm$^3$ | Three Point-Flexural Strength kg/mm$^2$ | Thermal Conductivity W/m·K |
|---|---|---|---|---|---|---|---|---|---|---|---|
| | | α-type Wt. % | β-type Wt. % | Amorphous Wt. % | β-type Wt. % | | | | | | |
| E-1 | 1 | — | 97.0 | 3.0 | — | — | — | — | 3.05 | 57 | 175 |
| | 2 | — | 95.0 | 5.0 | — | — | — | — | 3.15 | 65 | 197 |
| | 3 | — | 90.0 | 10.0 | — | — | — | — | 3.17 | 67 | 204 |
| E-2 | 4 | — | 97.0 | — | 3.0 | — | — | — | 3.08 | 59 | 180 |
| | 5 | — | 95.0 | — | 5.0 | — | — | — | 3.14 | 67 | 197 |
| | 6 | — | 90.0 | — | 10.0 | — | — | — | 3.18 | 70 | 212 |
| E-3 | 7 | 90.0 | — | 10.0 | — | — | — | — | 3.17 | 65 | 198 |
| | 8 | 90.0 | — | — | 10.0 | — | — | — | 3.12 | 60 | 190 |
| C-1 | 9 | 100.0 | — | — | — | — | — | — | 2.50 | 10 | 35 |
| C-2 | 10 | — | 96.7 | — | — | 3.0 | 0.30 | — | 3.17 | 54 | 105 |
| C-3 | 11 | 96.7 | — | — | — | 3.0 | 0.30 | — | 3.15 | 51 | 95 |
| C-4 | 12 | 97.0 | — | — | — | — | — | 3.0 | 3.17 | 75 | 45 |

Note:
"E" stands for "Example".
"C" stands for "Comparative".

thus giving rise to a good finished surface. This enables free spherical finishing or three-dimensional finishing, with the result that it is possible to obtain sintered products having any desired complex shapes with high accuracy.

In addition, the sintered silicon carbide bodies of the present invention have corrosion resistance superior to the conventional ones and exhibit a three point flexural strength at room temperature of 65 kg/mm$^2$ and that at a high temperature (1,500° C.) of 80 kg/mm$^2$ and a Vickers hardness of not lower than 2,500. Therefore, the sintered silicon carbide bodies of the present invention fully satisfy various characteristics such as high hardness, high mechanical strength, high corrosion resistance, and excellent surface smoothness and the like so that they are promising in various fields of application.

EXAMPLES

The present invention will be described in greater detail with reference to examples, comparative examples and test examples. However, the present invention should not be construed as being limited to the examples.

From the results shown in Table 1, it was confirmed that in the sintered silicon carbide bodies in this example, the resulting sintered bodies had a thermal conductivity of 170 W/m·K or more when the ultrafine amorphous silicon carbide powder was added. The sintered body obtained in Run No. 3 had a grain size of from 2 to 3 μm and had uniform structure and also had excellent characteristic of sintering, e.g., a three point flexural strength at 1,500° C. of 80 kg/mm$^2$.

EXAMPLE 2

To the same silicon carbide powder as used in Example 1 (the first silicon carbide powder) was added ultrafine β-type silicon carbide powder having a mean grain size of 0.017 μm and a specific surface area of 145 m$^2$/g (the second silicon carbide powder) obtained by gas phase synthesis by means of plasma CVD method using as the starting material a mixture of monosilane and ethylene, in an amount of from 3 to 10% by weight, and the mixture was treated and sintered under the same conditions as in Example 1 to produce sintered silicon carbide bodies.

The sintered silicon carbide bodies thus obtained were examined for their sintered density, three point flexural strength at room temperature and thermal conductivity. The results obtained are shown in Table 1.

The results shown in Table 1 confirms that the effect of the present invention was obtained sufficiently even when using the ultrafine β-type silicon carbide powder. In particular, No. 6 sintered silicon carbide body showed an excellent thermal conductivity of as high as 212 W/m·K.

EXAMPLE 3

To α-type silicon carbide powder having a means grain size of 0.07 μm and a specific surface area of 15 m²/g (the first silicon carbide powder) was added the ultrafine amorphous silicon carbide powder as used in Example 1 and the ultrafine β-type silicon carbide powder as used in Example 2 each in an amount of 10% by weight, and the mixture was treated and sintered under the same conditions as in Example 1 to produce sintered silicon carbide bodies.

The sintered silicon carbide bodies thus obtained were examined for their sintered density, three point flexural strength at room temperature and thermal conductivity. The results obtained are shown in Table 1.

As shown in Table 1, it was confirmed that the effect of the present invention was obtained using α-type silicon carbide powder as the first silicon carbide powder.

COMPARATIVE EXAMPLE 1

The same α-type silicon carbide powder as used in Example 3 was sintered under the same conditions as in Example 3 to produce sintered silicon carbide body. The density of the sintered body thus obtained was examined and the results obtained are shown in Table 1 for comparison.

The results shown in Table 1 show that the sample of Comparative Example 1 had a low sintered density as much as 2.50 g/cm³, a three point flexural strength of 10 kg/mm² and a thermal conductivity of 35 W/m·K, each of which characteristics was inferior to the samples of the present invention.

COMPARATIVE EXAMPLE 2

To the same β-type silicon carbide powder as used in Example 1 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 1 to produce sintered silicon carbide body.

Upon examination, the sintered body thus obtained had a grain size of from 4 to 5 μm and a thermal conductivity of 105 W/m·K, each of which values was lower than those of the high thermal conductivity sintered silicon carbide bodies of the invention.

To the same α-type silicon carbide powder as used in Example 3 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 1 to produce sintered silicon carbide body.

Upon examination, the sintered body thus obtained had a grain size of from 5 to 6 μm and a thermal conductivity of 95 W/m·K, each of which values was lower than those of the sintered silicon carbide bodies of the invention.

COMPARATIVE EXAMPLE 4

To the same α-type silicon carbide powder as used in Example 3 (the first silicon carbide powder) was added 3% by weight of alumina and the resulting mixture was sintered under the same conditions as in Example 3 except that the sintering temperature was set up at 2,000° C. and the sintering time was 30 minutes to produce sintered silicon carbide body.

Upon examination, the sintered body thus obtained showed a high three point flexural strength as high as 75 kg/mm², but it showed a thermal conductivity of 45 W/m·K, which value was much lower than that of the high thermal conductivity sintered silicon carbide bodies of the invention.

TEST EXAMPLE 1

Wire-type electron discharge machining test was conducted on Run No. 2 high conductivity sintered silicon carbide body obtained in Example 1 (diameter: 40 mm, thickness: 30 mm) using an electron discharge machining apparatus of transistor pulse circuit type. As for the discharge wire, there was used a bras wire of 2 mm in outer diameter. The test was performed under the conditions of a machining voltage of 50 V, pulse width of 1.2 μsec and pause of 20 μsec.

Upon the test, stable electron discharge machining was performed successfully. The speed of electron discharge machining was 150 mm²/minute and the maximum surface roughness of the electron discharge machined surface was on the order of Rmax 2.5 μm. From these, it was confirmed that the electron discharge machinability was good. In addition, the thus-treated surface was further subjected to finishing electron discharge machining to obtain an excellent smooth surface having an Rmax of 0.9 μm or less. Upon examination with a scanning type electron microscope it was revealed that the sintered body had no defects such as cracks.

EXAMPLE 4

To β-type silicon carbide powder having a mean grain size of 0.33 μm and a specific surface area of 12 m²/g and containing 0.85% by weight of silicon dioxide as an impurity (the first silicon carbide powder) was added from 5 to 10% by weight of ultrafine amorphous silicon carbide powder having a mean grain size of 0.02 μm and a specific surface area of 150 m²/g and containing 2.5% by weight of silicon dioxide as an impurity (the second silicon carbide powder) obtained by gas phase synthesis by means of plasma CVD method using as the starting material a mixture of silicon tetrachloride and ethylene, and further Novolak type phenol resin in an amount such that residual carbon content after pyrolysis became from 0.3 to 3% by weight, and the resulting mixture was dispersed in methanol and mixed for 12 hours using a ball mill.

Then, the resulting mixture was charged in a graphite mold after evaporating methanol in a drying vessel and grinding, and the graphite mold (diameter: 40mm) was fitted to a hot press apparatus.

The mixture was heated to a temperature of 1,500° C. in vacuum to debinderization and reduction treatment, followed by sintering in an argon atmosphere under a pressure of 400 kg/cm² at a sintering temperature of 2,150° C. for 45 minutes.

The sintered silicon carbide bodies thus obtained were examined for their sintered density, three point flexural strength at room temperature and thermal conductivity. The results obtained are shown in Table 2.

pyrolysis became 1% by weight, and the mixture was treated and sintered under the same conditions as in

TABLE 2

| | | Composition | | | | | | | Characteristics of Sintered Compact | | | |
|---|---|---|---|---|---|---|---|---|---|---|---|---|
| | | Crystal Phase of First Silicon Carbide Powder | | Crystal Phase of Second Silicon Carbide Powder | | Amount of Free Carbon | Amount of Boron | Amount of Alumina | Amount of Free Carbon | Density of Sintered Body | Three Point-Flexural Strength | Thermal Conductivity |
| E/C | Run No. | α-type Wt. % | β-type Wt. % | Amorphous Wt. % | β-type Wt. % | Wt. % | Wt. % | Wt. % | Weight % | g/cm³ | kg/mm² | W/m · K |
| E-4 | 1 | — | 94.5 | 5.0 | — | 0.5 | — | — | 0.21 | 3.15 | — | 230 |
| | 2 | — | 94.0 | 5.0 | — | 1.0 | — | — | 0.31 | 3.16 | — | 235 |
| | 3 | — | 93.0 | 5.0 | — | 2.0 | — | — | 0.94 | 3.16 | 67 | 200 |
| | 4 | — | 88.0 | 10.0 | — | 2.0 | — | — | 0.36 | 3.16 | — | 220 |
| E-5 | 5 | — | 94.0 | — | 5.0 | 1.0 | — | — | 0.55 | 3.16 | — | 230 |
| | 6 | — | 93.0 | — | 5.0 | 2.0 | — | — | 0.65 | 3.17 | 67 | 205 |
| E-6 | 7 | 94.0 | — | 5.0 | — | 1.0 | — | — | 0.75 | 3.15 | 68 | 215 |
| E-7 | 8 | — | 90.0 | — | 10.0 | (0.5) | — | — | 0.26 | 3.16 | 70 | 235 |
| C-5 | 9 | — | 96.7 | — | — | 3.0 | 0.3 | — | — | 3.17 | 54 | 105 |
| C-6 | 10 | 97.0 | — | — | — | — | — | 3.0 | — | 3.17 | 75 | 45 |
| C-7 | 11 | — | 92.0 | 5.0 | — | 3.0 | — | — | 1.35 | 3.12 | — | 160 |

Note.
"E" stands for "Example".
"C" stands for "Comparative".
Numbers in the brackets denote the free carbon in the ultrafine silicon carbide powder obtained by gas phase synthesis by means of plasma CVD method.

From the results shown in Table 2, it was confirmed that in the sintered silicon carbide bodies obtained in this example, the resulting sintered bodies had a thermal conductivity of 220 W/m·K or more when the ultrafine amorphous silicon carbide powder with the content of free carbon being not more than 1% by weight was added. The sintered body obtained in Run No. 2 had a grain size of from 2 to 3 μm and had uniform structure and also had excellent characteristic, e.g., a three point flexural strength at 1,500° C. of 80 kg/mm².

EXAMPLE 5

To the same silicon carbide powder as used in Example 4 (the first silicon carbide powder) was added 5% by weight of ultrafine β-type silicon carbide powder having a mean grain size of 0.017 μm and a specific surface area of 145 m²/g and containing 1.55% by weight of silicon dioxide as an impurity (the second silicon carbide powder) obtained by gas phase synthesis by means of plasma CVD method using as the starting material a mixture of monosilane and ethylene, and further Novolak type phenol resin in an amount such that residual carbon content after pyrolysis became from 1 to 2% by weight, and the mixture was treated and sintered under the same conditions as in Example 4 to produce sintered silicon carbide bodies.

The sintered silicon carbide bodies thus obtained were examined for their sintered density, three point flexural strength at room temperature and thermal conductivity. The results obtained are shown in Table 2.

The results shown in Table 2 confirms that the effect of the present invention was obtained sufficiently even when using the ultrafine β-type silicon carbide powder. In particular, No. 5 sintered silicon carbide body showed an excellent thermal conductivity of as high as 230 W/m·K.

EXAMPLE 6

To a α-type silicon carbide powder having a mean grain size of 0.70 μm and a specific surface area of 15 m²/g and containing 0.7% by weight of silicon dioxide as an impurity (the first silicon carbide powder) was added 5% by weight of the ultrafine amorphous silicon carbide powder as used in Example 4 (the second silicon carbide powder) and further Novolak type phenol resin in an amount such that residual carbon content after Example 4 to produce sintered silicon carbide bodies.

The sintered silicon carbide bodies thus obtained were examined for their sintered density, three point flexural strength at room temperature and thermal conductivity. The results obtained are shown in Table 2.

As shown in Table 2, it was confirmed that the effect of the present invention was obtained using α-type silicon carbide powder as the first silicon carbide powder.

EXAMPLE 7

The same silicon carbide powder as the first silicon carbide powder used in Example 1 was provided. The second silicon carbide powder containing free carbon was prepared as follows.

That is, monosilane and ethylene as the starting materials were subjected to gas phase synthesis by means of plasma CVD method under the conditions in which their molar ratio was changed such that C/Si ratio by mole became not smaller than 1.2 to obtain ultrafine β-type silicon carbide powder having a mean grain size of 0.019 μm and a specific surface area of 155 m²/g and containing 1.40% by weight of silicon dioxide as an impurity and 5.25% by weight of free carbon (the second silicon carbide powder).

Then, 10.5% by weight of the second silicon carbide powder containing free carbon was added to the first silicon carbide powder, and mixed. The resulting mixture was subjected to reduction treatment in the same manner as in Example 4, followed by sintering in the same manner as in Example 4 to obtain sintered silicon carbide bodies.

The sintered silicon carbide bodies thus obtained were examined for their sintered density, three point flexural strength at room temperature and thermal conductivity. The results obtained are shown in Table 2.

As shown in Table 2, it was confirmed that the effect of the present invention was further improved using, as the source of carbon for reducing the oxides contained in the silicon carbide powder, the free carbon contained in the ultrafine silicon carbide powder prepared by gas phase synthesis by means of CVD method.

COMPARATIVE EXAMPLE 5

To the same β-type silicon carbide powder as used in Example 4 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 4 to produce sintered silicon carbide body.

Upon examination, the sintered body thus obtained had a grain size of from 4 to 5 μm and a thermal conductivity of 105 W/m·K, each of which values was lower than those of the high thermal conductivity sintered silicon carbide bodies of the invention.

COMPARATIVE EXAMPLE 6

To the same α-type silicon carbide powder as used in Example 6 (the first silicon carbide powder) were added 3% by weight of alumina and the resulting mixture was sintered under the same conditions as in Example 6 except that the sintering temperature was set up at 2,000° C. and the sintering time was 30 minutes to produce sintered silicon carbide body.

Upon examination, the sintered body thus obtained showed a high three point flexural strength as high as 75 kg/mm$^2$, but it showed a thermal conductivity of 45 W/m·K, which value was much lower than that of the high thermal conductivity sintered silicon carbide bodies of the invention.

COMPARATIVE EXAMPLE 7

To the same β-type silicon carbide powder as used in Example 4 (the first silicon carbide powder) were added 5% by weight of ultrafine amorphous silicon carbide powder (the second silicon carbide powder) or 5% by weight of ultrafine β-type silicon carbide powder (the second silicon carbide powder) and further Novolak type phenol resin in an amount such that residual carbon content after pyrolysis became 4% by weight and mixed, followed by sintering the resulting mixture under the same conditions as in Example 4 to produce sintered silicon carbide bodies.

Upon examination, each of the sintered bodies had a low thermal conductivity due to high content free carbon in the sintered body.

TEST EXAMPLE 2

Wire-type electron discharge machining test similar to that carried out in Test Example 1 was conducted on Run No. 3 high conductivity sintered silicon carbide body obtained in Example 4 (diameter: 40 mm, thickness: 30 mm) using an electron discharge machining apparatus of transistor pulse circuit type. As for the discharge wire, there was used a brass wire of 2 mm in outer diameter. The test was performed under the conditions of a machining voltage of 50 V, pulse width of 1.2 μsec and pause of 20 μsec.

Upon the test, stable electron discharge machining was performed successfully. The speed of electron discharge machining was 170 mm$^2$/minute and the maximum surface roughness of the electron discharge machined surface was on the order of Rmax 2.2 μm. From these, it was confirmed that the electron discharge machinability was good. In addition, the thus-treated surface was further subjected to finishing electron discharge machining to obtain an excellent smooth surface having an Rmax of 0.7 μm or less. Upon examination with a scanning electron microscope it was revealed that the sintered body had no defects such as cracks.

What is claimed is:

1. A sintered silicon carbide body with a high thermal conductivity of not less than 150 W/m·K, prepared without a sintering aid by
   (a) forming a mixture consisting essentially of:
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting a gas phase synthesis between said silane compound or silicon halide and said hydrocarbon at a pressure of from less than 760 torr to 0.1 torr, and
   (b) sintering the resulting mixture at a temperature of from 1,800° to 2,400° C.

2. A process of producing a sintered silicon carbide body with a high thermal conductivity of not less than 150 W/m·K, prepared without a sintering aid by
   (a) forming a mixture consisting essentially of:
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting a gas phase synthesis between said silane compound or silicon halide and said hydrocarbon at a pressure of from less than 760 torr to 0.1 torr, and
   (b) sintering the resulting mixture at a temperature of from 1,800° to 2,400° C.

3. A sintered silicon carbide body with a high thermal conductivity of not less than 180 W/m·K, prepared without a sintering aid by
   (a) forming a mixture consisting essentially of:
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting a gas phase synthesis between said silane compound or silicon halide and said hydrocarbon at a pressure of from less than 760 torr to 0.1 torr, and
      (3) a carbon powder which is required for reducing oxides contained in both said first and said second silicon carbide powders,
   (b) reducing said oxides with said carbon, and
   (c) sintering the resulting mixture at a temperature of from 1,800° to 2,400° C.

4. A process of producing a sintered silicon carbide body with a high thermal conductivity of not less than 180 W/m·K, prepared without a sintering aid by
   (a) forming a mixture consisting essentially of:
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and (2-2) conducting a gas phase synthesis between said silane compound or silicon halide and said hydrocarbon at a pressure of from less than 760 torr to 0.1 torr, and (3) a carbon powder which is required for reducing oxides contained in both said first and said second silicon carbide powders, (b) reducing said oxides with said carbon, and (c) sintering the resulting mixture at a temperature of from 1,800° to 2,400° C.

5. The sintered body of claim 1, wherein said sintering is conducted in a sintering atmosphere selected from the group consisting of inert atmosphere and reducing atmosphere.

6. The sintered body as claimed in claim 5, wherein said sintering is conducted under vacuum.

7. The process of claim 2, wherein said sintering is conducted in a sintering atmosphere selected from the group consisting of inert atmosphere and reducing atmosphere.

8. The process as claimed in claim 7, wherein said sintering is conducted under vacuum.

9. The sintered body of claims 1 or 3, wherein said second silicon carbide powder has a crystal phase selected from the group consisting of amorphous type, α-type, β-type and mixtures thereof.

10. The sintered body of claim 3, wherein said carbon is contained in said second silicon carbide powder.

11. The sintered body of claims 1 or 3, wherein said sintered body has a density of not less than 3.00 g/cm$^3$.

12. The sintered body of claim 3, wherein said carbon is contained in an amount of not more than 1% by weight.

13. The sintered body of claims 1 or 3, wherein said second silicon carbide powder is from 0.5 to 50% by weight of the resulting mixture.

14. The sintered body of claim 3, wherein said carbon is selected from the group consisting of carbon black, colloidal carbon and pyrolytic carbon derived from an organic hydrocarbon.

15. The process of claim 4, wherein said carbon is selected from the group consisting of carbon black, colloidal carbon and pyrolytic carbon derived from an organic hydrocarbon.

16. The process of claim 4, wherein said sintering is conducted in a sintering atmosphere selected from the group consisting of inert atmosphere and reducing atmosphere.

17. The process as claimed in claim 16, wherein said sintering is conducted under vacuum.

18. The process as claimed in claims 2 or 4, wherein the content of said second silicon carbide powder is from 0.5 to 50% by weight.

19. The process as claimed in claims 2 or 4, wherein said second silicon carbide powder has a crystal phase selected from the group consisting of amorphous type, α-type, β-type and mixtures thereof.

20. The process as claimed in claim 4, wherein said carbon is contained in said first silicon carbide powder.

21. The process as claimed in claim 4, wherein said carbon is contained in said second silicon carbide powder.

22. The process as claimed in claim 4, wherein said reduction treatment is conducted vacuum.

* * * * *

UNITED STATES PATENT AND TRADEMARK OFFICE
CERTIFICATE OF CORRECTION

PATENT NO. : 5,094,985
DATED : March 10, 1992
INVENTOR(S) : Kazunori Kijima et al.

It is certified that error appears in the above-identified patent and that said Letters Patent is hereby corrected as shown below:

On the title page: Item [73] Assignee

The assignees are incorrect, should be, --Kazunori Kijima, Kyoto; Sumitomo Cement Co., Ltd., Tokyo, both of Japan--.

Signed and Sealed this

Fourteenth Day of June, 1994

Attest:

BRUCE LEHMAN

Attesting Officer

Commissioner of Patents and Trademarks